(12) United States Patent
Fergusson et al.

(10) Patent No.: US 8,978,487 B2
(45) Date of Patent: Mar. 17, 2015

(54) CAPACITIVE FORCE SENSOR WITH MAGNETIC SPRING

(71) Applicant: Research in Motion Limited, Waterloo (CA)

(72) Inventors: Andrew Ashraf Fergusson, St. Clements, CA (US); Iouri Petrovitch Besperstov, Innisfil, CA (US)

(73) Assignee: BlackBerry Limited, Waterloo (CA)

( * ) Notice: Subject to any disclaimer, the term of this patent is extended or adjusted under 35 U.S.C. 154(b) by 159 days.

(21) Appl. No.: 13/713,278

(22) Filed: Dec. 13, 2012

(65) Prior Publication Data

US 2014/0165742 A1 Jun. 19, 2014

(51) Int. Cl.
*G01L 1/00* (2006.01)
*G06F 3/033* (2013.01)
*G01L 1/14* (2006.01)
*G06F 3/0354* (2013.01)

(52) U.S. Cl.
CPC ............ *G01L 1/144* (2013.01); *G06F 3/03545* (2013.01)
USPC ...................................... 73/862.626; 345/179

(58) Field of Classification Search
CPC ........ G06F 3/03545; G06F 3/016; H01G 5/16
USPC ...................................... 73/862.626; 345/179
See application file for complete search history.

(56) References Cited

U.S. PATENT DOCUMENTS

| | | | |
|---|---|---|---|
| 5,134,689 A * | 7/1992 | Murakami et al. ............ | 345/443 |
| RE34,187 E * | 3/1993 | Yamanami et al. ........ | 178/18.07 |
| 5,206,785 A | 4/1993 | Hukashima | |
| 5,565,632 A | 10/1996 | Ogawa | |
| 5,576,502 A * | 11/1996 | Fukushima et al. ....... | 73/862.68 |
| 5,914,708 A | 6/1999 | LaGrange et al. | |
| 6,353,427 B1 * | 3/2002 | Rosenberg ..................... | 345/156 |
| 6,683,780 B2 | 1/2004 | Thomas et al. | |
| 6,727,439 B2 | 4/2004 | Chao et al. | |
| 6,801,192 B2 | 10/2004 | Fujitsuka et al. | |
| 7,696,444 B2 | 4/2010 | Liu et al. | |
| 7,785,027 B1 | 8/2010 | McKinley et al. | |
| 8,184,109 B2 | 5/2012 | Fukushima et al. | |
| 8,199,132 B1 | 6/2012 | Oda et al. | |

(Continued)

FOREIGN PATENT DOCUMENTS

| | | |
|---|---|---|
| DE | 102009060976 | 1/2011 |
| DE | 202012101911 | 6/2012 |
| JP | S593537 | 1/1984 |

OTHER PUBLICATIONS

European Search Report, EP12197080.0, Jul. 1, 2013.

*Primary Examiner* — Lisa Caputo
*Assistant Examiner* — Jonathan Dunlap
(74) *Attorney, Agent, or Firm* — Leveque Intellectual Property Law, P.C.

(57) ABSTRACT

The present disclosure provides a method and apparatus for a capacitive force sensor utilizing a magnetic spring. The force is applied across a body and a moveable element that are coupled by the magnetic spring. The moveable element is configured to vary the capacitance of a variable capacitor. A sensing circuit, electrically coupled to the variable capacitor, provides a force signal characteristic of the applied force. In application to a stylus pointing device, the moveable element is coupled to a moveable tip of the stylus. The force signal, which is characteristic of the force applied to the tip of the stylus, may be used to control an application executed on a host electronic device.

24 Claims, 8 Drawing Sheets

(56) References Cited

U.S. PATENT DOCUMENTS

| | | |
|---|---|---|
| 8,287,204 B2 | 10/2012 | Silverbrook et al. |
| 2001/0038384 A1* | 11/2001 | Fukushima et al. .......... 345/179 |
| 2002/0070927 A1 | 6/2002 | Fujitsuka et al. |
| 2003/0141119 A1* | 7/2003 | Chao et al. ................ 178/19.01 |
| 2005/0116940 A1* | 6/2005 | Dawson ....................... 345/179 |
| 2008/0252621 A1 | 10/2008 | Shipton |
| 2011/0192658 A1 | 8/2011 | Fukushima et al. |
| 2011/0219892 A1* | 9/2011 | Fukushima et al. ......... 73/865.4 |
| 2012/0146958 A1 | 6/2012 | Oda et al. |
| 2013/0106794 A1* | 5/2013 | Logan et al. .................. 345/179 |
| 2013/0241897 A1* | 9/2013 | Fukushima et al. .......... 345/179 |
| 2013/0269446 A1* | 10/2013 | Fukushima et al. ............ 73/818 |
| 2014/0029156 A1* | 1/2014 | Obata, Masayuki .......... 361/270 |
| 2014/0062967 A1* | 3/2014 | Lu et al. ....................... 345/179 |
| 2014/0069532 A1* | 3/2014 | Obata .......................... 137/554 |
| 2014/0085270 A1* | 3/2014 | Obata .......................... 345/179 |

* cited by examiner

CAPACITIVE FORCE SENSOR WITH MAGNETIC SPRING

BACKGROUND

Stylus pointing devices enable information to be input to a host electronic device. When the tip of the stylus is placed in close proximity to a drawing and/or display surface of the host device, the position of the tip may be determined by the host by a variety of methods, including the influence of the stylus on the electrical properties of the tablet (i.e., via electromagnetic induction, changes in electrical resistance, electrical capacitance, and the like); the optical properties of the tablet; or by ultrasonic positioning.

Some stylus pointing devices also provide a force, or pressure, output indicative of how hard a user is pressing the stylus against the drawing/display surface of the host electronic device. A variety of force sensors have been used. In many, the stress applied to the tip of the stylus is applied to an elastic element, resulting in a movement or strain of the element that, in turn, produces a change in an electrical property of a sensing circuit. In one approach, two plates of a capacitive sensor are held apart by a mechanical spring. The stress applied to the tip of the stylus compresses the spring and produces movement of one plate. However, this approach requires the use of a mechanical spring to bias the two plates of the capacitive sensor apart. However, mechanical springs are subject to fatigue, and spring rates may vary with temperature, age, etc.

Accordingly, it would be useful, therefore, to provide a capacitive sensor that does not require the use of a mechanical spring and is suitable for use in a stylus pointing device.

BRIEF DESCRIPTION OF THE DRAWINGS

Exemplary embodiments of the present disclosure will be described below with reference to the included drawings such that like reference numerals refer to like elements and in which.

DETAILED DESCRIPTION

Figure 1:
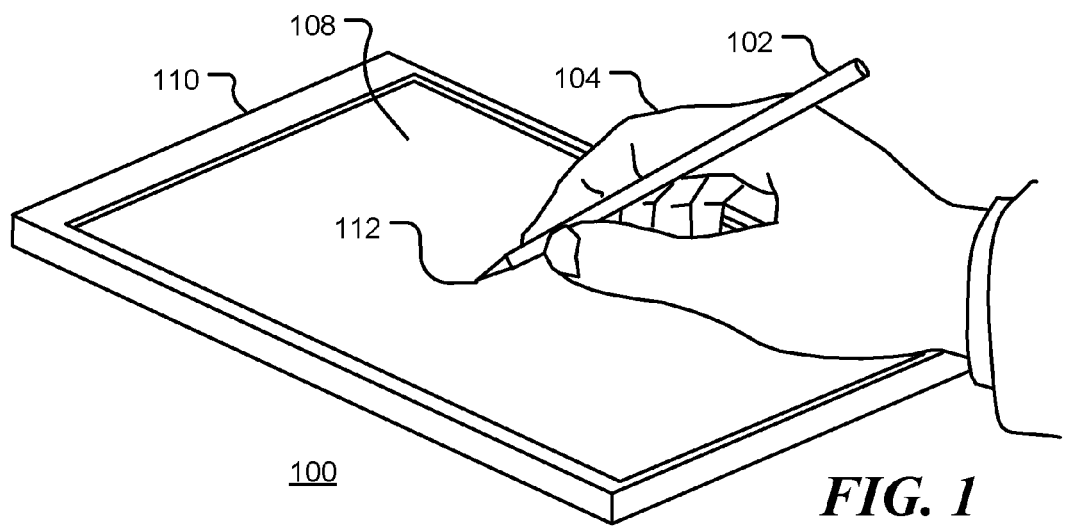
FIG. 1 is a diagram of a force sensing stylus and a host electronic device, in accordance with exemplary embodiments of the present disclosure.

For simplicity and clarity of illustration, reference numerals may be repeated among the figures to indicate corresponding or analogous elements. Numerous details are set forth to provide an understanding of the illustrative embodiments described herein. The embodiments may be practiced without these details. In other instances, well-known methods, procedures, and components have not been described in detail to avoid obscuring the disclosed embodiments. The description is not to be considered as limited to the scope of the embodiments shown and described here.

An exemplary aspect of the present disclosure relates to a force sensor operable to sense a force applied across a body. The force sensor includes a magnetic spring coupled between a body of the force sensor and a moveable element that resists a force applied across the body and the moveable element. The force sensor also includes a variable capacitor having first and second capacitor plates. The capacitance of the variable capacitor is dependent upon a position of the movable element with respect to the body. A sensing circuit, electrically coupled to the first and second capacitor plates of the variable capacitor, provides a force signal dependent upon a capacitance of the variable capacitor.

The moveable element may be one plate of the variable capacitor or may be a dielectric element that varies the permittivity of the space close to the plates of the variable capacitor.

For example, in one exemplary embodiment, the force sensor includes a variable capacitor that has a first capacitor plate that is moveably located with respect to the body of the force sensor and is configured to receive the force applied across the body. The force sensor also includes a second capacitor plate that is coupled to the body and located in proximity to the first capacitor plate. A sensing circuit, electrically coupled to the first and second capacitor plates of the variable capacitor, provides a force signal dependent upon a capacitance of the variable capacitor. The force applied across the body is resisted by a magnetic spring that produces a magnetic force between first and second magnets.

The force sensor may be used in a stylus pointing device, for example, where it produces a force signal characteristic of a force applied to the stylus. In this application, the force signal is produced by sensing a separation between a first magnet coupled to a body of the stylus and a second magnet coupled to a moveable tip of the stylus. The two magnets are configured to magnetically repel one another.

In one illustrative embodiment, the first magnet provides a first capacitor plate of the variable capacitor. In a further embodiment, the first magnet is non-conducting and is coupled to a conducting capacitor plate. The separation between magnets is sensed by sensing the capacitance of the variable capacitance.

A further aspect of the present disclosure relates to a stylus that is operable to provide a force signal to a host electronic device. The stylus includes a body with a moveable tip and a variable capacitance sensor. The variable capacitance sensor includes a first capacitor plate coupled to the moveable tip of the stylus, a second capacitor plate coupled to the body of the stylus and located in proximity to the first capacitor plate, and a sensing circuit electrically coupled to the first and second capacitor plates and operable to provide the force signal dependent upon a capacitance of the variable capacitor. A force applied to the moveable tip of the stylus is resisted by a magnetic force between the first and second magnets of a magnetic spring.

A further aspect of the present disclosure relates to a non-transitory computer-readable medium having computer-executable instructions that, when executed by a processor of a host electronic device, cause the host electronic device to control an application by receiving a stylus signal characteristic of a capacitance between a first capacitor plate coupled to a body of a stylus and a second capacitor plate coupled to a moveable tip of the stylus. The capacitance is dependent upon a separation of the first and second capacitor plates. In turn, the separation between the first and second magnetic plates is dependent upon a force applied to the moveable tip of the stylus and a magnetic force between first and second magnets of a magnetic spring. The force applied to the tip of the stylus is determined dependent upon the received stylus signal, and the application is controlled dependent upon the force applied to the tip of the stylus. The force applied to the tip of the stylus may be determined dependent upon calibration parameters stored in a memory of the host electronic device.

By way of example, an illustrative embodiment of a force sensing system 100 is shown in FIG. 1. In this example, a force sensor is included in a stylus pointing device 102. The system includes the stylus 102 and a host electronic device 110. In FIG. 1, the stylus 102 is operated by a user 104 and interacts with a drawing surface 108 of a host electronic device 110. In the embodiment shown, the drawing surface 108 is combined with a visual display screen, although a separate display screen may be used. The host electronic device 110 may be a smart-phone, personal digital assistant (PDA), portable computer, tablet computer or any device utilizing a graphical user interface or drawing surface, for example. In operation, the tip 112 of the stylus 102 contacts the drawing surface 108. The contact force is sensed by the stylus 102 and is communicated to the host electronic device 110 via a wired or wireless connection.

Figure 2:
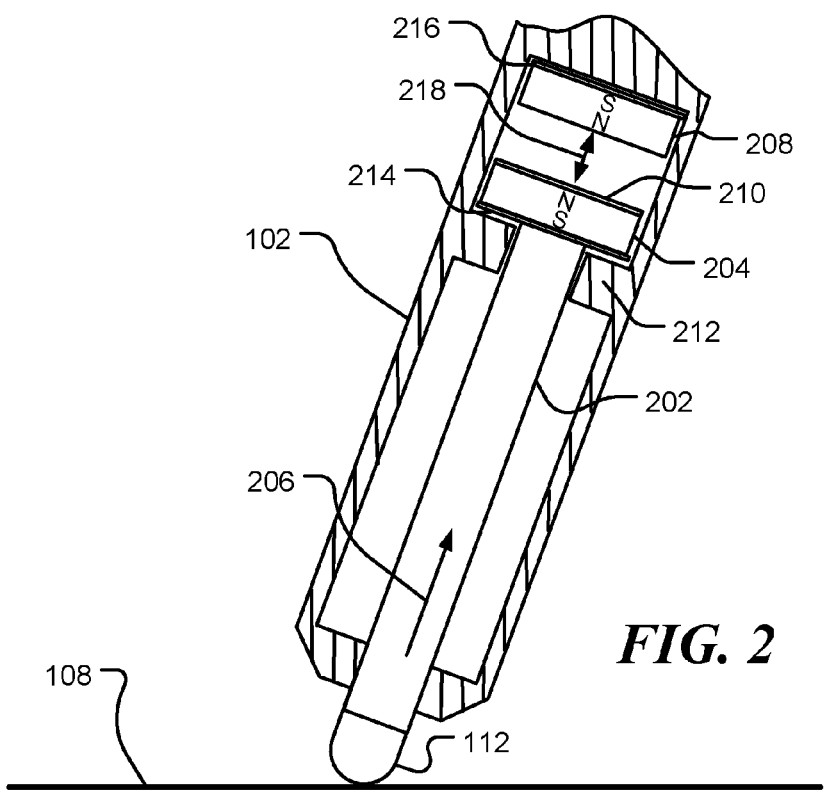
FIG. 2 is a diagrammatic representation of the tip end of a stylus, in accordance with an exemplary embodiment of the disclosure.

FIG. 2 is a diagrammatic representation of the tip end of a stylus, in accordance with an exemplary embodiment of the disclosure. A longitudinal section is shown. The moveable tip 112 of the stylus extends from the lower end of the stylus 102 and may be brought into contact with a drawing surface 108. The tip 112 is coupled via coupling element 202 (shown as a shaft in the figure) to a first magnet 204 and a first capacitor plate 214. The tip 112, coupling element 202, first magnet 204 and capacitor plate 214 are movable in a direction indicated by the arrow 206. A second magnet 208 and a second capacitor plate 216 are coupled to the body of the stylus 102. In one exemplary embodiment, the first and second magnets 204 and 208 are permanent magnets. The magnets may be disc-shaped, for example, although other magnet shapes and configurations may be used. The magnets may be electrically conducting or electrically insulating. In a further embodiment, the first and second magnetic elements are electrically conducting and are used as the capacitor plates.

The magnets are positioned such that a face of the first magnet 204, having a first magnetic polarity, is adjacent a face of the second magnet 208 having the same magnetic polarity. In FIG. 2, the north poles (indicated by 'N' in the figure) of the permanent magnets are facing one another such the magnets repel one another. Optionally, a layer of dielectric material 210, located between the first and second magnetic elements, may be used to maintain a minimum separation between the first and second magnetic elements. The dielectric layer 210 may be elastomeric or substantially rigid.

The maximum separation between the capacitor plates 214 and 216 is determined by the location of mechanical stop element 212.

The magnetic force, indicated by the arrow 218, between the first and second magnets, 204 and 208, increases as the separation between the two plates decreases. The magnets therefore act a non-linear magnetic spring. The maximum separation, and hence the minimum magnetic spring force, is determined by the location of mechanical stop element 212.

Once the force applied to tip 112 exceeds the minimum magnetic spring force, the first magnet 204 moves to a position where the magnetic spring force balances the contact force applied at the tip 112. Thus, there is a direct relationship between the force applied to the tip and the resulting separation between the first and second capacitor plates. In FIG. 2, the force applied to the tip 112 is less than the minimum magnetic spring force, so the first capacitor plate 214 remains in contact with the stop 212.

Figure 3:
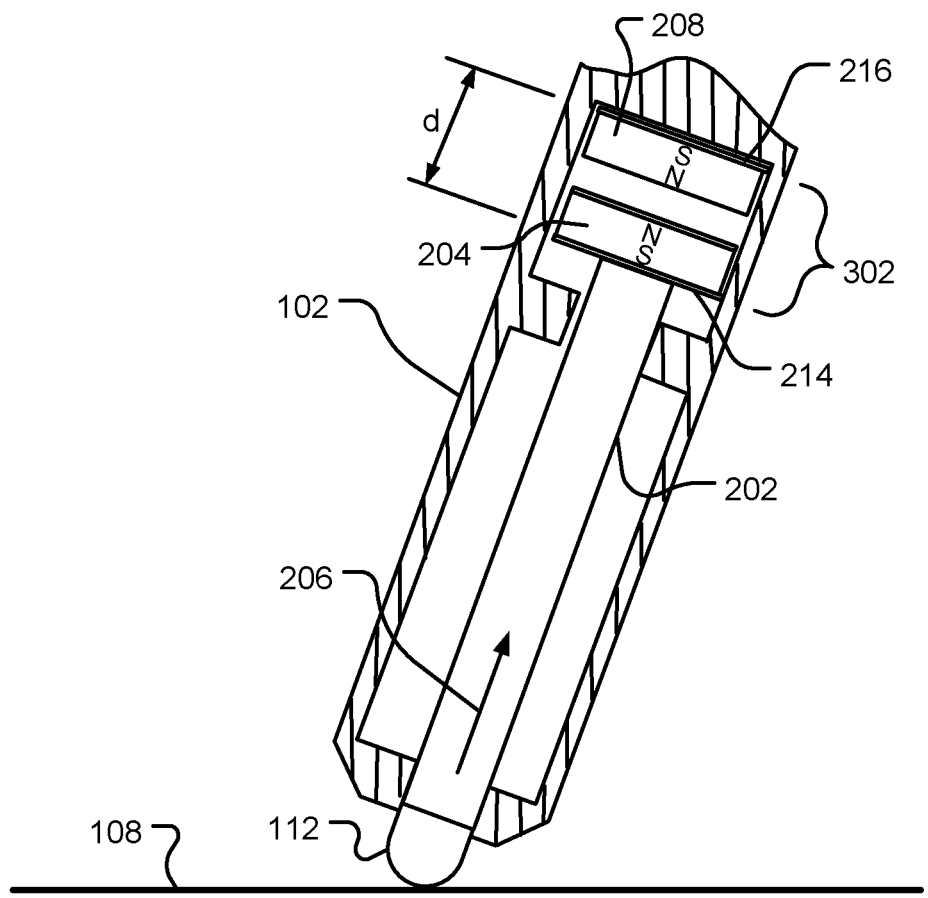
FIG. 3 is a further diagrammatic representation of the tip end of a stylus, in accordance with an exemplary embodiment of the disclosure.

FIG. 3 is a further diagrammatic representation of the tip end of a stylus 102, in accordance with an exemplary embodiment of the disclosure. In the configuration shown in FIG. 3, the force applied to the tip 112 is greater than the minimum magnetic spring force, so the first capacitor plate 214 is displaced from the stop 212 and the separation between the magnets (and the separation between the capacitor plates) is reduced. The applied force is balanced by the magnetic spring force when the first and second capacitor plates are separated by a distance d.

There is a direct relationship between the force applied to the tip 112 and the resulting separation, d, between the first and second capacitor plates 214 and 216. In addition, the capacitance of the variable capacitor 302 formed by the first and second capacitor plates, 214 and 216, is dependent upon the separation d between the plates. The variable capacitor 302 is electrically coupled to in a sensing circuit in which one or more properties of the sensing circuit, such as, for example, a voltage or a frequency or a phase response are dependent upon the capacitance.

For capacitor plates of area A, separated by a dielectric medium with permittivity $\in$, the capacitance C is approximately related to the separation d by $$C = \frac{\varepsilon A}{d}. \tag{1}$$

When the applied force $F_{applied}$ is balanced by the magnetic spring force $F_{magnetic}$, the forces are approximately related to the separation d by $$F_{applied} = F_{magnetic} \cong \frac{6\mu_0 m^2}{4\pi d^4}, \tag{2}$$

where $\mu_0$ is the magnetic constant (permeability of free space) and m is the magnetic moment of the magnetic capacitor plates. Eliminating the separation d from equations (1) and (2) gives $$F_{applied} = F_{magnetic} \cong \frac{6\mu_0 m^2 C^4}{4\pi (\varepsilon A)^4}. \tag{3}$$

Equation (3) demonstrates an approximate relationship between the applied force $F_{applied}$ and the capacitance C. Thus, a measurement of the capacitance C, or (equivalently) a measured quantity that is dependent upon the capacitance C, enables to the applied force $F_{applied}$ to be determined.

In practice, the relationship between a measured quantity (dependent upon the capacitance C) and the applied force may be determined by calibration. For example, in equation (3) above, the quantity $$p = \frac{6\mu_0 m^2}{4\pi(\varepsilon A)^4}$$

may be considered to be a calibration parameter.

A variety of capacitance sensing circuits are known to those of skill in the art.

In one illustrative embodiment, the first and second magnets function both as the plates of the capacitor and as a magnetic spring that biases the plates apart from one another.

Figure 4:
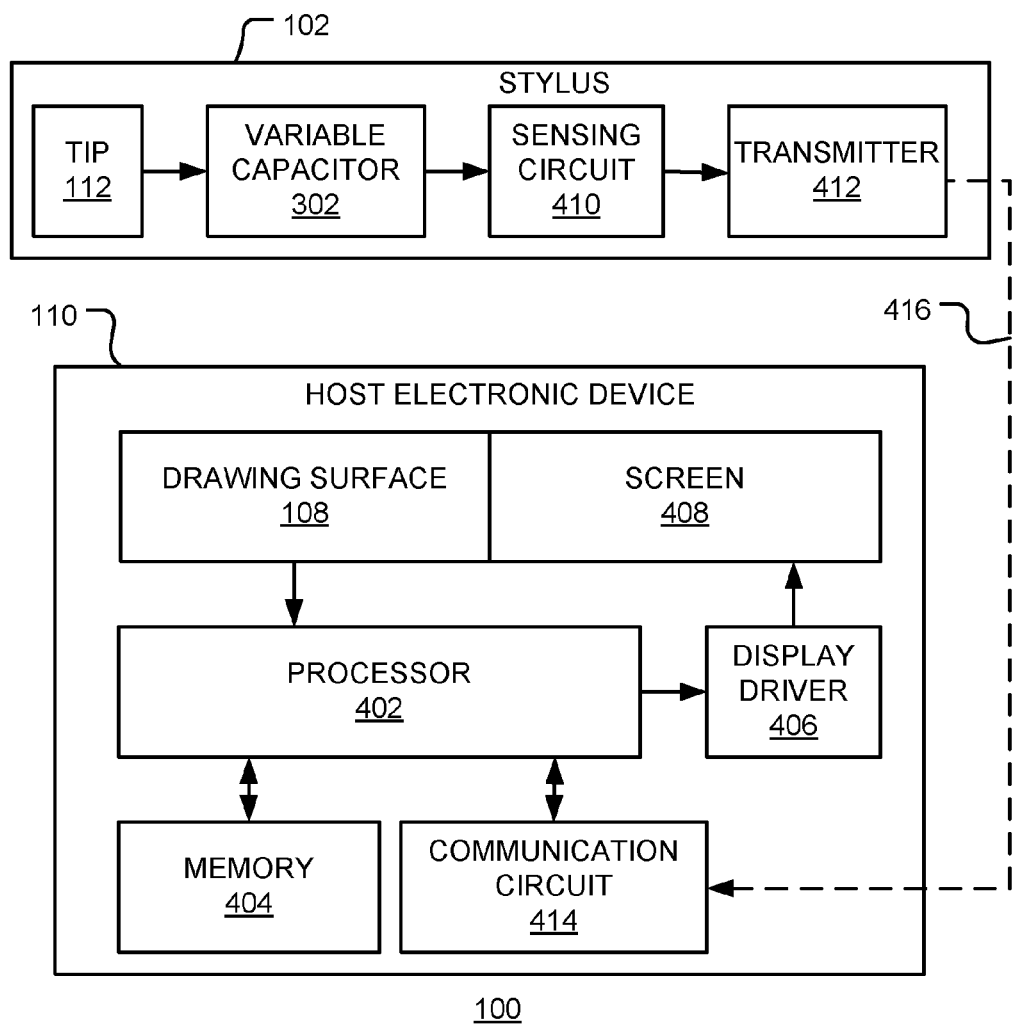
FIG. 4 is a block diagram of system that includes a force sensing stylus and a host electronic device, in accordance with exemplary embodiments of the present disclosure.

FIG. 4 is a block diagram of system 100 that includes a stylus 102 and a host electronic device 110, in accordance with exemplary embodiments of the present disclosure. The host electronic device 110 includes a processor 402 coupled to a memory 404. The processor 402 is also coupled to a display driver 406 that is used to render images on a screen 408. The screen 408 may be integrated with the drawing surface 108. The drawing surface 108 may be used to sense a location of the stylus 102. The memory 404 may be used to store an operating system and various user applications that may be executed on the processor 402. The operating system and user applications control the processor to display elements of a graphical user interface on the screen 408. The stylus 102 may be used to interact with the displayed graphical user interface to provide input to the operating system or other user applications executed on the processor 402.

The stylus 102 includes a moveable tip 112, motion of which alters the capacitance of a variable capacitor 302. A sensing circuit 410, which is electrically coupled to the variable capacitor 302, outputs a stylus force signal to a transmitter 412. The sensing circuit 410 may be, for example, an oscillator circuit having a frequency dependent upon the capacitance of the variable capacitor. A frequency signal produced by the oscillator may be supplied to a frequency-to-voltage converter, a counter that counts the period of the frequency signal. The resulting voltage or count may be used to generate a digital signal for output. Alternatively, the frequency signal may be used to modulate a radio frequency (RF) signal for wireless transmission via electromagnetic, ultrasonic, optical or other communication path. The stylus force signal 416 is transmitted to a communication circuit 414 of the host electronic device 110. The stylus force signal 416 is characteristic of the force applied to the tip 112 of the stylus 102 and may be used as an input to control software applications executed on the processor 402 of the host electronic device 110.

Figure 5:
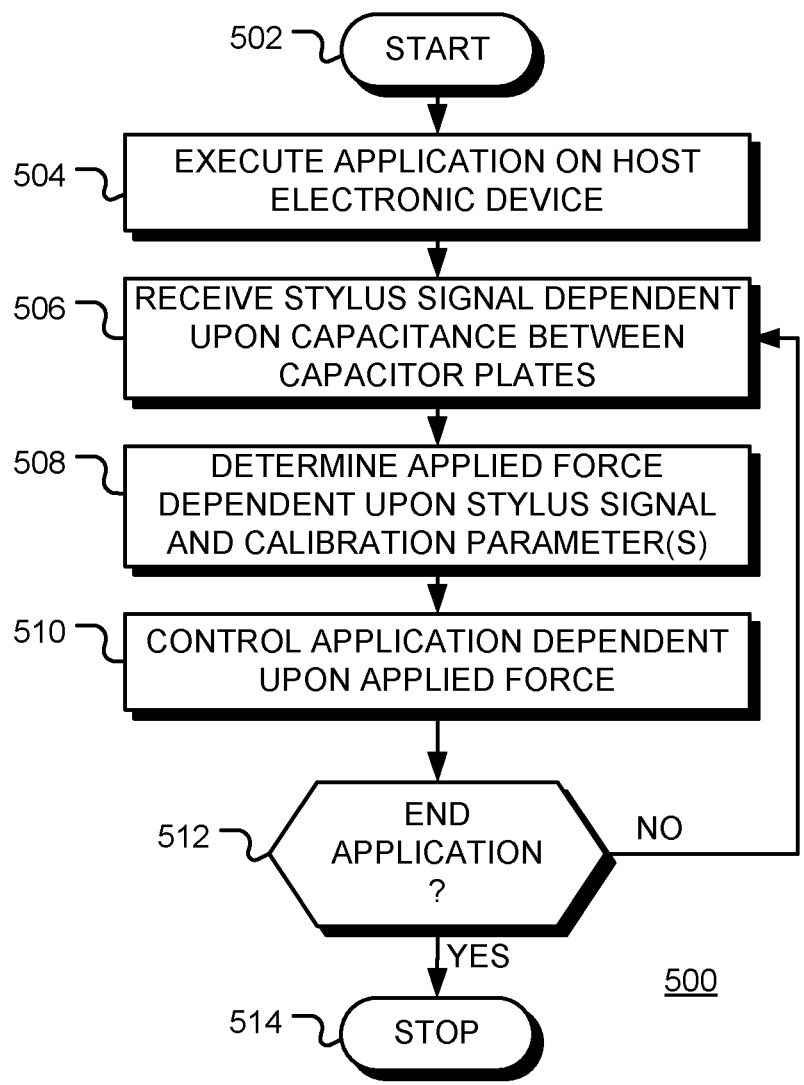
FIG. 5 is a flow chart of a method for controlling an application executed on host electronic device, in accordance with certain embodiments of the present disclosure.

FIG. 5 is a flow chart of a method 500 for controlling an application on host electronic device, in accordance with certain embodiments of the present disclosure. The method may be implemented on the host electronic device by executing instructions stored on a non-transitory computer-readable medium, for example. Following start block 502 in FIG. 5, execution of an application is started on the host electronic device at block 504. A stylus signal, characteristic of a capacitance between first and second capacitor plates of the stylus, is received by the host electronic device at block 506. The capacitance is dependent upon a force applied to the moveable tip of the stylus and a magnetic force between two magnets of a magnet spring. At block 508 the force applied to the tip of the stylus is determined dependent upon the received stylus signal. The force may also depend upon calibration parameters stored in a memory of the host electronic device. At block 510, the application is controlled dependent upon the force applied to the tip of the stylus. For example, in a computer drawing application, one or more properties of a line being drawn, such as the width, saturation, texture, style etc., may be varied dependent upon the force applied to the tip of the stylus. In another example, the force applied to a control of a graphical user interface may be used to adjust an application parameter dependent upon the force signal. The time history of the force may also be used. For example, tapping the stylus produces a characteristic time waveform that may be recognized and used to control aspects of the application. If execution of the application is terminated, as depicted by the positive branch from decision block 512, the method terminates at block 514. Otherwise, as depicted by the negative branch from decision block 512, flow returns to block 506.

Figure 6:
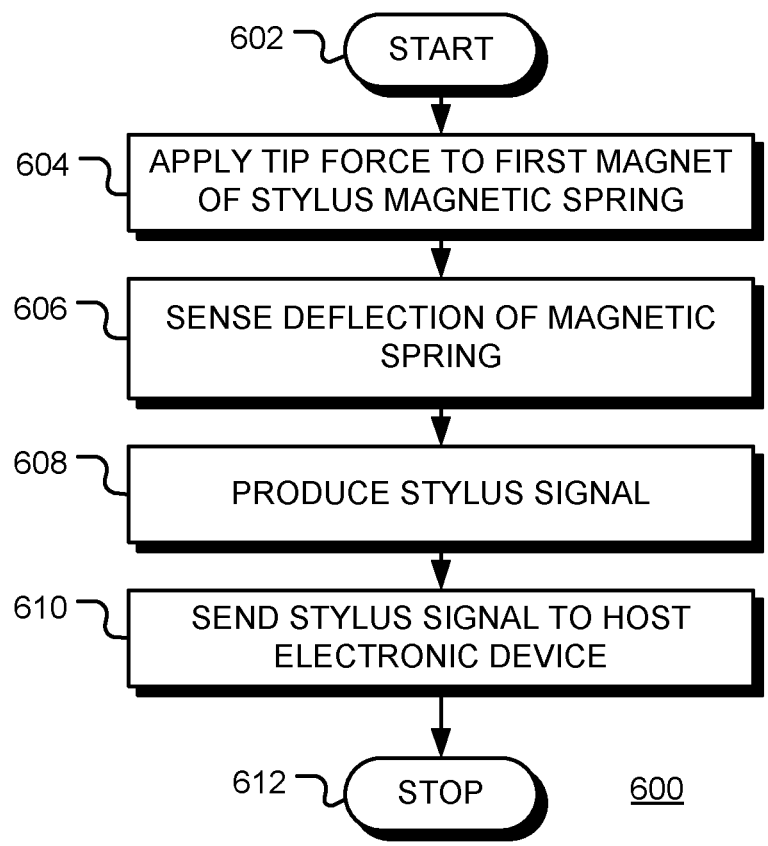
FIG. 6 is a flow chart of a method for producing a force signal characteristic of a force applied to a stylus, in accordance with certain embodiments of the present disclosure.

FIG. 6 is a flow chart of a method 600 for producing a force signal characteristic of a force applied to a stylus, in accordance with certain embodiments of the present disclosure. Following start block 602, a force applied to a moveable tip of the stylus is transferred to a first magnet of a magnetic spring at block 604. At block 606, the deflection of the magnetic spring is sensed. The deflection may be sensed, for example, by sensing a capacitance that is varied by a moveable element that is coupled to the moveable tip of the stylus and moves with the first magnet. The first and second magnets are biased apart by their respective magnetic fields, such that the separation between the magnets is dependent upon the force applied to the moveable tip of the stylus. In one exemplary embodiment, the first and second magnets form first and second plates of a variable capacitor and the separation between the first and second magnets is sensed by sensing a capacitance of the variable capacitor. A stylus signal, characteristic of the force applied to the moveable tip, is produced at block 608 and, at block 610, the stylus signal is sent to a host electronic device, where it may be used, for example, to control a software application executing on the host electronic device. The method terminates at block 612.

Figure 7:
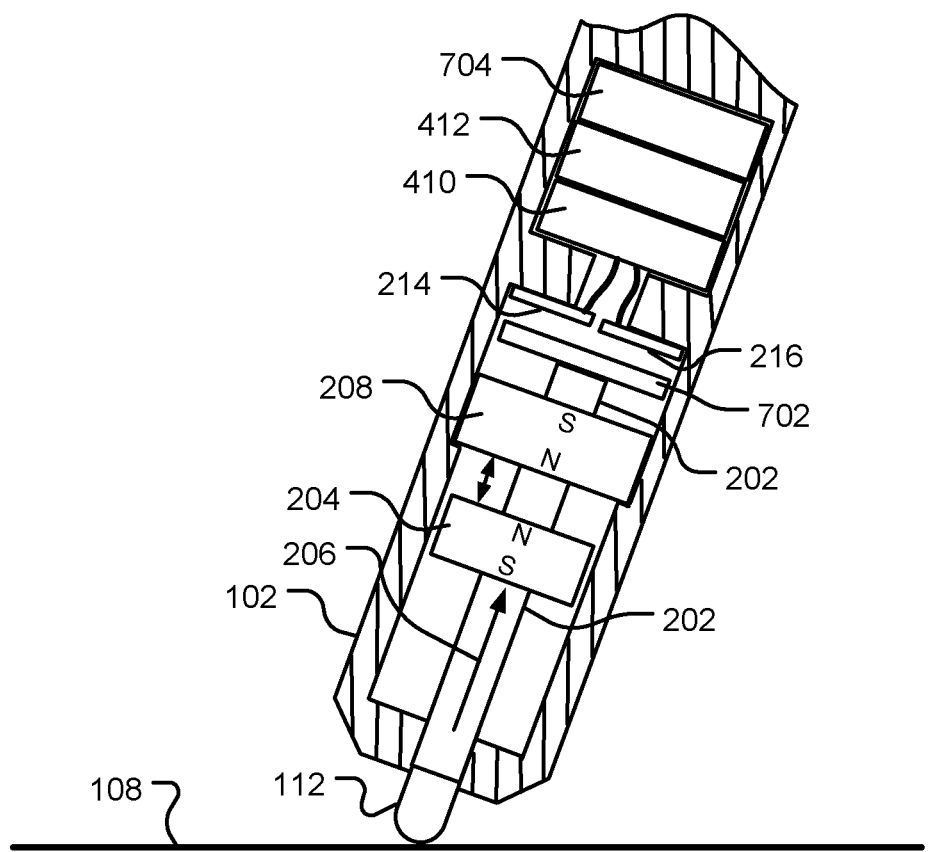
FIG. 7 is a diagrammatic representation of the tip end of a stylus, in accordance with a further embodiment of the disclosure.

FIG. 7 is a diagrammatic representation of the tip end of a stylus, in accordance with a further embodiment of the disclosure. The tip 112 of the stylus is coupled, via coupling element 202, to a first magnet 204 and a movable element 702. The movable element 702 may include a high-k dielectric material or metal, for example. The surface of the dielectric element 702 that contacts the capacitor plates 214 and 216 is electrically insulating.

In operation, the elements 112, 202, 204 and 702 move in unison. A second magnet 208 is coupled to the body of the stylus 102. In this embodiment, the coupling element 202 passes through a hole in the second magnet 208 and the second magnet supports sliding of the coupling element 202. The dielectric element 702 is located in proximity to first and second capacitor plates, 214 and 216, which are attached to the body of the stylus 102. In operation, since the moveable plate has a different permittivity to air, movement of the tip 112 moves the dielectric element 702 and alters the effective permittivity $\in$ in proximity to the capacitor plates. When a metal moveable element 702 is used, the capacitance C is approximately related to the separation d between the moveable element and the capacitor plates by $$C = \frac{\varepsilon A}{2d}. \qquad (4)$$

In this embodiment, neither capacitor plate moves with the tip, which results in a more robust force sensor.

The capacitor plates 214 and 216 are electrically coupled to a sensing circuit 410. The sensing circuit 410 outputs a stylus force signal to a transmitter 412. The force signal may be transmitted to a communication circuit of a host electronic device. The force signal is characteristic of the force applied to the tip 112 of the stylus 102 and may be used as an input to control software applications executed on the host electronic device.

Figure 8:
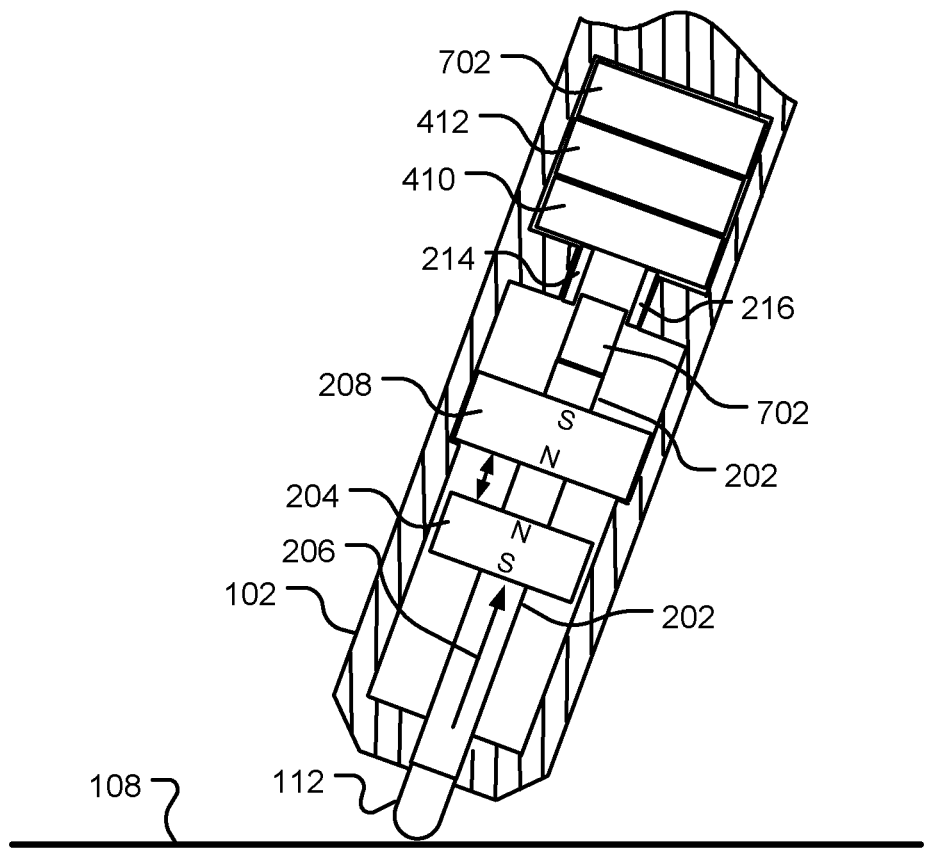
FIG. 8 is a diagrammatic representation of the tip end of a stylus, in accordance with a still further embodiment of the disclosure.

FIG. 8 is a diagram of a further embodiment, in which at least a portion of each fixed capacitor plate, 214 and 216, is orientated along the length of the stylus and the dielectric element 702 moves between the capacitor plates.

When the plates have length l, and are separated by a distance d, the capacitance is approximated by $$C = \frac{\varepsilon_0(l-x)}{d} + \frac{\varepsilon x}{d} = \frac{x(\varepsilon - \varepsilon_0)}{d} + \frac{\varepsilon_0 l}{d}, \quad (5)$$

where x is length of capacitor plate occupied by the moveable element, $\varepsilon$ is the permittivity of the moveable element and $\varepsilon_0$ is the permittivity of air. Thus, apart from an offset, the capacitance varies linearly with the position of the moveable element, Other configurations will be apparent to those of skill in the art. For example, fixed concentric capacitor plates may be used with a dielectric ring moving between them.

Figure 9:
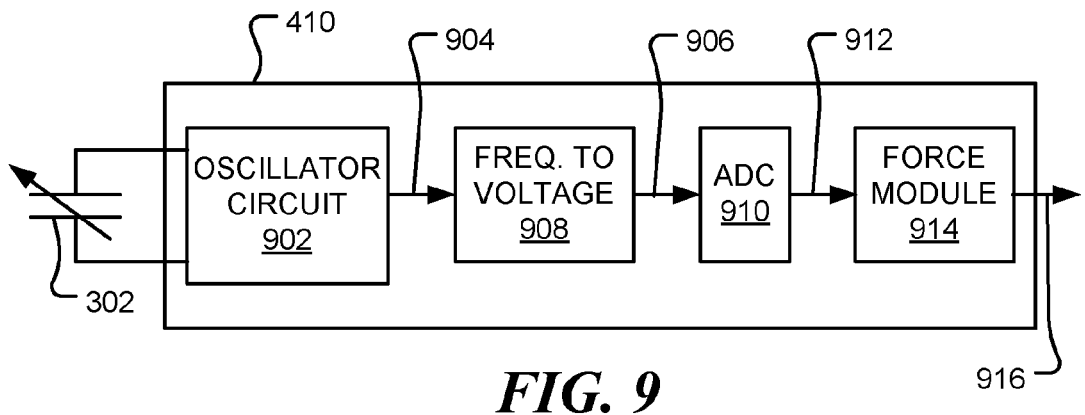
FIGS. 9-11 are block diagrams of exemplary capacitance sensing circuits, in accordance with embodiments of the disclosure.

FIG. 9 is a block diagram of an example of a sensing circuit in accordance with an exemplary embodiment of the invention. The sensing circuit 410 includes an oscillator circuit 902 that is electrically coupled to the variable oscillator 302. The frequency signal 904 output from the oscillator circuit depends upon the capacitance of the variable capacitor 302. The frequency signal 904 is converted to a voltage signal 906 in frequency-to-voltage converter 908. The voltage signal 906 is converted to a digital signal in analog-to-digital converter (ADC) 910. The resulting digital signal 912 is supplied to a force module 914 that converts the frequency dependent digital voltage signal 912 into a force signal. The resulting force signal 916 is output. Alternatively, the frequency dependent digital voltage signal 912 may be output to a host electronic device that performs the frequency-to-force conversion.

Figure 10:
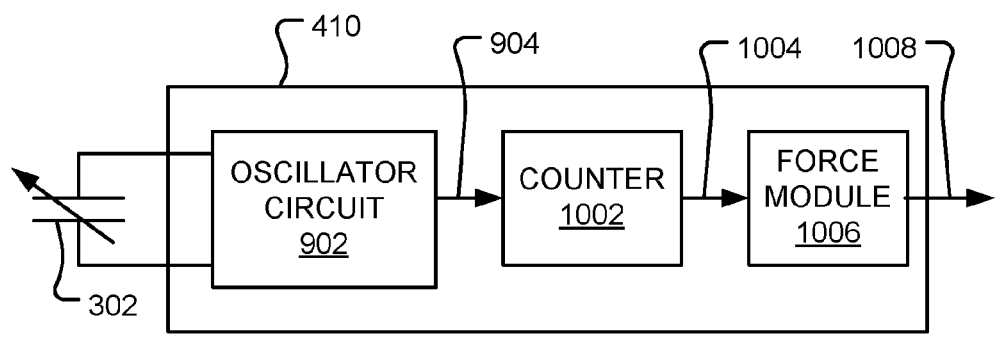

FIG. 10 is a block diagram of a further example of a sensing circuit in accordance with an illustrative embodiment of the invention. The sensing circuit 410 includes an oscillator circuit 902 that is electrically coupled to the variable oscillator 302. The frequency signal 904 output from the oscillator circuit depends upon the capacitance of the variable capacitor 302. The period of the frequency signal 904 is counted by counter 1002, which may, for example, count a number of clock cycles between zero crossings in the frequency signal 904. The resulting counter value 1004 is supplied to a force module 1006 that converts the count value into a force signal 1008 for transmission to a host electronic device. Alternatively, the counter value 1004 may be output to a host device that performs the count-to-force conversion.

Figure 11:
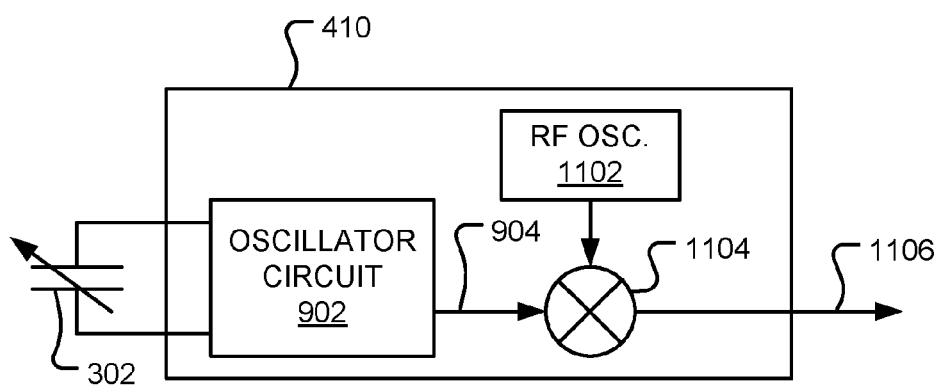

FIG. 11 is a block diagram of a further example of a sensing circuit in accordance with an exemplary embodiment of the invention. The sensing circuit 410 includes an oscillator circuit 902 that is electrically coupled to the variable oscillator 302. The frequency signal 904 output from the oscillator circuit depends upon the capacitance of the variable capacitor 302. A radio frequency (RF) oscillator 1102 generates an RF signal that is modulated by frequency signal 904 in signal multiplier 1104. The resulting modulated RF signal 1106 is provided as output. This signal may be communicated to a host device, where it may be demodulated to recover the frequency signal and, hence, the applied force.

Other sensing circuits will be apparent to those of ordinary skill in the art.

It will be appreciated that any module or component disclosed herein that executes instructions may include or otherwise have access to non-transient and tangible computer readable media such as storage media, computer storage media, or data storage devices (removable or non-removable) such as, for example, magnetic disks, optical disks, or tape data storage. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the server, any component of or related to the network, backend, etc., or accessible or connectable thereto. Any application or module herein described may be implemented using computer readable/executable instructions that may be stored or otherwise held by such computer readable media.

The implementations of the present disclosure described above are intended to be merely exemplary. It will be appreciated by those of skill in the art that alterations, modifications and variations to the illustrative embodiments disclosed herein may be made without departing from the scope of the present disclosure. Moreover, selected features from one or more of the above-described embodiments may be combined to create alternative embodiments not explicitly shown and described herein.

The present disclosure may be embodied in other specific forms without departing from its spirit or essential characteristics. The described exemplary embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A force sensor comprising:
   a magnetic spring coupled between a body of the force sensor and a moveable element that resists a force applied across the body and the moveable element along a first direction;
   a variable capacitor having first and second capacitor plates, the capacitance of the variable capacitor dependent upon a position of the movable element with respect to the body along the first direction; and
   a sensing circuit electrically coupled to the first and second capacitor plates of the variable capacitor and operable to provide a force signal dependent upon a capacitance of the variable capacitor and characteristic of the applied force.

2. The force sensor of claim 1, where the body comprises a stylus operable to provide the force signal to a host electronic device, the stylus comprising:
   a moveable tip coupled to the moveable element,
   where the force signal is characteristic of a force applied to the moveable tip of the stylus.

3. The force sensor of claim 2, where the stylus further comprises a transmitter, operable to transmit the force signal to a host electronic device.

4. The force sensor of claim 2, where the stylus further comprises a coupling element adapted to couple between the moveable tip of the stylus and the moveable element.

5. The force sensor of claim 1, where the magnetic spring comprises:
   a first magnet coupled to the moveable element; and
   a second magnet coupled to the body,
where the first and second magnets are configured to magnetically repel one another.

6. The force sensor of claim 5, where the first and second magnets are configured such that a face of the first magnet having a first magnetic polarity is adjacent a face of the second magnet having the same magnetic polarity.

7. The force sensor of claim 1, where the first capacitor plate comprises the moveable element and the second capacitor plate is coupled to the body.

8. The force sensor of claim 1, where the first and second capacitor plates are coupled to the body and the moveable element comprises a dielectric element located in proximity to the first and second capacitor plates.

9. The force sensor of claim 1, where the first and second capacitor plates are coupled to the body and the moveable element comprises a metal plate located in proximity to the first and second capacitor plates.

10. The force sensor of claim 1, where the variable capacitor further comprises:
    a dielectric layer located between the first and second capacitor plates.

11. The force sensor of claim 1, where the sensing circuit provides a signal having a frequency dependent upon the capacitance of the variable capacitor.

12. The force sensor of claim 1, where a stop element is formed by the second magnet.

13. A force sensor comprising:
    a magnetic spring coupled between a body of the force sensor and a moveable element that resists a force applied across the body and the moveable element;
    a variable capacitor having first and second capacitor plates, the capacitance of the variable capacitor dependent upon a position of the movable element with respect to the body; and
    a sensing circuit electrically coupled to the first and second capacitor plates of the variable capacitor and operable to provide a force signal dependent upon a capacitance of the variable capacitor and characteristic of the applied force,
where the magnetic spring comprises:
    a first magnet coupled to the moveable element; and
    a second magnet coupled to the body, the first and second magnets configured to magnetically repel one another, and
where the body further comprises a stop element configured to limit a maximum separation between the first and second magnets.

14. A method for generating a force signal characteristic of a force applied across a body, the method comprising:
    sensing a separation between a first magnet, movably located with respect to the body and configured to receive the force applied across the body, and a second magnet coupled to the body, the first and second magnets biased apart by their respective magnetic fields; and
    limiting a maximum separation between the first and second magnets using a stop element of the body.

15. The method of claim 14, where sensing the separation comprises sensing a capacitance of a variable capacitor, the capacitance of which is dependent upon the separation between the first and second magnets.

16. The method of claim 15, where a first plate of the variable capacitor is coupled to, and operable to move with, the first magnet and where a second plate of the variable capacitor is coupled to the body.

17. The method of claim 14, where the body comprises a stylus operable to provide the force signal to a host electronic device, the method further comprising:
    coupling a moveable tip of the stylus to the first magnetic capacitor plate,
where the force signal is characteristic of a force applied to the moveable tip of the stylus.

18. The method of claim 17, further comprising:
    transmitting the force signal to the host electronic device.

19. A method for generating a force signal characteristic of a force applied across a body and a moveable element, the method comprising:
    sensing a capacitance between first and second capacitor plates of a variable capacitor, the capacitance dependent upon a position of the moveable element with respect to the body,
where the moveable element is coupled to the body via a magnetic spring such that the position of the moveable element with respect to the body is dependent upon the force applied across the body and the moveable element, where the magnetic spring comprises:
    a first magnet coupled to the moveable element; and
    a second magnet coupled to the body, the first and second magnets configured to magnetically repel one another, and
    limiting a maximum separation between the first and second magnets using a stop element of the body.

20. The method of claim 19, where sensing the capacitance of the variable capacitor comprises:
    sensing a frequency variation of a signal through the variable capacitor.

21. The method of claim 19, where the body comprises a stylus operable to provide the force signal to a host electronic device, the method further comprising:
    transmitting the force signal to the host electronic device.

22. A non-transitory computer-readable medium having computer-executable instructions that, when executed by a processor of a host electronic device, cause the host electronic device to control an application by:
    receiving a stylus signal characteristic of a separation between first and second magnets of a magnetic spring coupled between a moveable tip of a stylus and a body of the stylus, the separation dependent upon a force applied to the moveable tip of the stylus and the magnetic force between the first and second magnets and the separation further dependent upon a stop element that limits a maximum separation between the first and second magnets;
    determining the force applied to the tip of the stylus dependent upon the received stylus signal; and
    controlling the application dependent upon the force applied to the tip of the stylus.

23. The non-transitory computer-readable medium of claim 22 having further computer-executable instructions that, when executed by a processor of a host electronic device, cause the host electronic device to control the application by:
    determining the force applied to the tip of the stylus dependent upon calibration parameters stored in a memory of the host electronic device.

24. A force sensor comprising:
    a magnetic spring coupled between a body of the force sensor and a moveable element that resists a force applied across the body and the moveable element;

a variable capacitor having first and second capacitor plates, the capacitance of the variable capacitor dependent upon a position of the movable element with respect to the body;

a sensing circuit electrically coupled to the first and second capacitor plates of the variable capacitor and operable to provide a force signal dependent upon a capacitance of the variable capacitor and characteristic of the applied force, where the first and second capacitor plates are coupled to the body and the moveable element is located in proximity to the first and second capacitor plates.

* * * * *